Aug. 16, 1955     M. W. MARIEN     2,715,555
COMPRESSION PISTON RING
Filed April 9, 1953
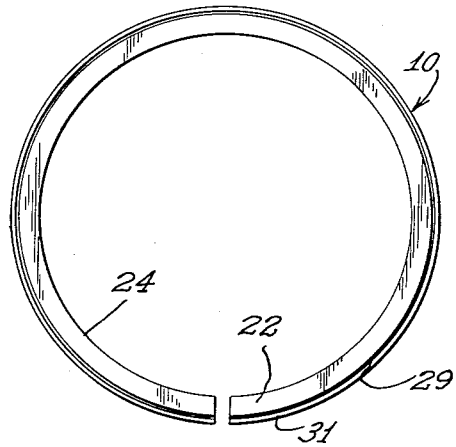
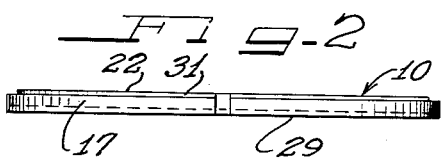
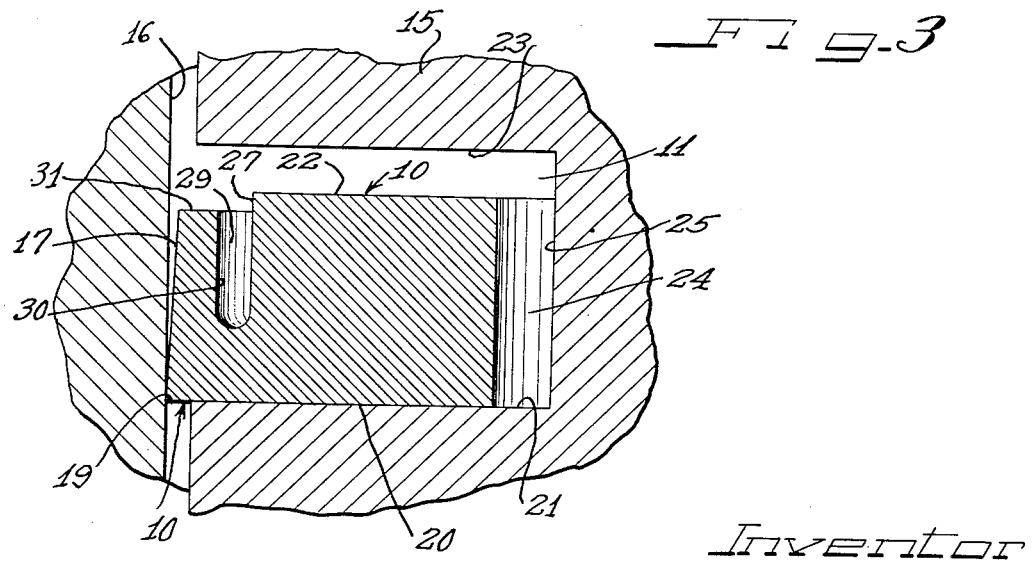
Inventor
MELVIN W. MARIEN
by Hill, Sherman, Meroni, Gross & Simpson Attys

United States Patent Office 2,715,555
Patented Aug. 16, 1955

2,715,555

COMPRESSION PISTON RING

Melvin W. Marien, St. Louis, Mo., assignor to Ramsey Corporation, St. Louis, Mo., a corporation of Ohio Application April 9, 1953, Serial No. 347,754

4 Claims. (Cl. 309—44)

This invention relates to improvements in piston rings and more particularly relates to piston rings adapted for top groove applications in internal combustion engines.

A principal object of my invention is to provide a new and improved fast seating piston ring particularly adapted to be located in the top groove of the piston of an internal combustion engine.

Another object of my invention is to provide a piston ring of a novel construction arranged with a view toward reducing ring flutter, ring groove wear and blow-by.

A further object of my invention is to provide a more efficient piston ring for top groove application, so arranged as to reduce ring flutter, ring groove wear and blow-by, by providing a pressure cavity on the upper face of the ring in which the gases of combustion may enter from the side of the cavity and force the ring in contact with the cylinder wall and the bottom of the piston ring groove and create a seal against pressure along the lower groove edge of the piston.

A still further object of my invention is to provide a simple and improved form of oil control ring having a novel form of pressure cavity extending along the top face thereof, of sufficient depth that the pressure acting thereon acts as a cushion and reduces movement of the ring with respect to the ring groove, and wear on the faces of the groove of the piston.

A still further object of my invention is to provide a fast seating piston ring having a cylinder contacting face tapered inwardly toward the top of the ring, to provide line contact with the cylinder wall adjacent the bottom of the ring during the period of wearing in the ring.

A further and more detailed object of my invention is to provide a new and improved piston ring contacting the cylinder wall by its own resiliency and having a stepped upper face of lesser height adjacent the outer periphery of the ring than the body thereof and a cavity connecting the faces of the ring together and serving as a pressure cushion for the inertia forces developed during operation of the piston.

These and other objects of my invention will appear from time to time as the following specification proceeds and with reference to the accompanying drawing wherein:

Figure 1 is a top plan view of a piston ring constructed in accordance with my invention;

Figure 2 is a view in side elevation of the ring shown in Figure 1; and

Figure 3 is an enlarged fragmentary cross-sectional view taken through the cylinder and piston of an internal combustion engine, and showing the ring in position in the top groove of the piston.

In the embodiment of my invention illustrated in the drawing, I have shown a piston ring 10 of a split type in position in a piston ring groove 11 of a piston 15 and in engagement with a cylinder wall 16 of an internal combustion engine. The ring 10 may be a cast iron ring having an outer cylinder wall contacting face 17, tapering inwardly from the bottom of the ring. The ring 10 is shown as having initial line contact with the cylinder wall at its lower end when breaking in the ring, as indicated by reference character 19 and is engaged with the cylinder wall by its own resiliency, and by the pressure of the gases acting thereon, as will hereinafter more clearly appear as this specification proceeds.

The ring also has a bottom face 20 resting on a lower face 21 of the ring groove, an upper face 22 spaced downwardly from an upper face 23 of the ring groove, and an inner peripheral wall 24 spaced from a bottom or inner wall 25 of the ring groove. The wall 24 forms a pressure area against which pressure passing along the ring face 22 exerts a force on the ring, to move the ring away from the groove bottom 25, and force the lower line contact edge 19 of the ring in engagement with the wall of the cylinder.

The top surface or face 22 of the ring is shown as being parallel to the bottom face 20 thereof, and as terminating at its outer edge into a wall 27 of a pressure cavity 29. The pressure cavity 29 extends along the top face of the ring for the entire length thereof, and downwardly into the ring for a substantial depth, to provide a surface area against which pressure may act in addition to the pressure area along the inner wall of the ring, and force the ring into contact with the cylinder wall 16. The cavity 29 is shown as having an outer wall 30 parallel to the wall 27 but of a lesser height than the wall 27 and terminating at its upper edge into a stepped face 31 of the ring. The stepped face 31 is spaced downwardly from the face 22, to accommodate the gas pressures to pass into the pressure cavity 29, even though the ring may be resting on the upper face 23 of the ring groove of the piston. Gas pressure may thus exert a continual force within the cavity 29 and force the ring toward the groove face 21, and into engagement with the wall of the cylinder wall 16.

The cavity 29 is shown as being of a substantial depth greater than half the thickness of the piston ring, although it may be of a lesser depth, but should have sufficient volumetric capacity to provide a reservoir or effective area for the compressed gases and the gases of combustion to act thereon, and serve as a cushion for the inertia forces developed during operation of the engine and exert a force to seal the bottom of the piston ring groove.

It may be seen from the foregoing that the effective pressure area of the wall 27 is considerably less than the effective pressure areas of the walls 29 and 24 and that this, in addition to the resiliency of the ring and the tapered face thereof, assures tight engagement of the ring with the cylinder wall 16, particularly during the period of breaking in the ring.

It may also be seen that the tapered face of the ring having line contact with the cylinder wall during the period of breaking in the ring, assures a faster seating ring than formerly.

It may still further be seen that since the face 31 is in a lower plane with respect to the groove face 23 of the piston than the face 22 of the ring, and since the cavity 29 is within the limits of the piston groove, that the compressive pressures and the pressures of the gases of combustion will pass into the cavity 29, regardless of whether the ring may be on the piston groove face 21 or 23 maintaining the ring in engagement with the bottom face 21 of the ring groove, and assuring that pressure is available to engage the cylinder wall 16.

It may also be seen that the pressure cavity 29 of the ring assures a constant cushioning force on the ring, and reduces wear on the groove faces 21 and 23 of the piston, as well as reducing ring flutter and the tendency of the ring to twist in its groove, and thereby providing a lighter tighter fitting cast ring than has heretofore been thought possible.

It is further obvious from the foregoing that since pressure acts on the cavity 29 in all positions of the ring in its piston groove and serves as a pressure cushion for the ring, that the sealing efficiencies of the ring along the piston groove face 21 are improved as well as between the wall of the cylinder 16 and the outside periphery of the ring, thereby reducing blow-by to a minimum.

It will be understood that modifications and variations may be effected without departing from the scope of the novel concepts of the present invention.

I claim as my invention:

1. A piston ring comprising a radially slit annular ring having a tapered periphery tapering inwardly from the bottom of the ring to have line contact with the cylinder wall at its lower edge when breaking in the ring, and also having an upwardly opening pressure cavity recessed within the top face thereof and extending therearound.

2. A piston ring comprising a radially slit resilient annular ring having generally parallel top and bottom faces and a tapered outer periphery, tapering inwardly from the bottom of the ring, to have line contact with the wall of the cylinder at the lower edge of the ring during the period of initially breaking in the ring, said ring also having a circumferential upwardly opening pressure cavity recessed within the top face thereof and extending therearound adjacent the outer edge of the ring, said cavity having parallel walls, the inner of which walls is longer than the outer, and the outer of said walls terminating into a relatively thin upper outer face of the ring, stepped downwardly from the major thickness of the ring, and affording access to the gases of combustion to said cavity regardless of the position of the ring with respect to the groove of the piston.

3. In combination with a piston having a ring groove and mounted for movement along the cylinder wall of an internal combustion engine, a piston ring in said groove, said piston ring comprising a radially slit resilient annular ring having generally parallel top and bottom faces and a tapered cylinder wall engaging outer periphery, tapering inwardly from the bottom of the ring, and also having an upwardly opening pressure cavity extending circumferentially around the top surface of the ring adjacent the outer edge thereof, but within the limits of the piston, the outer edge of said cavity terminating into a downwardly stepped edge face of the ring and affording access to said cavity when the ring is in engagement with the upper face of the ring groove.

4. In combination with a piston movable within a cylinder of an internal combustion engine, said piston having a ring groove having parallel top and bottom faces and having a piston ring therein, said ring comprising a radially slit resilient annular ring having generally parallel top and bottom faces and having a tapered outer periphery tapering inwardly from the botom of the ring to having line contact with the cylinder wall at the lower edge of the ring during the period of initially breaking in the ring, the top face of said ring being stepped and the downwardly stepped portion thereof defining the outer vertical margin of the ring and extending within the ring groove of the piston, and a pressure cavity extending downwardly into the ring and circumferentially therealong and defining the inner margin of the downwardly stepped portion of the ring and forming a cushioning means for the inertia forces developed during operation of the ring, and balancing the pressures on the ring and maintaining the ring in engagement with the cylinder wall and the bottom face of the piston ring groove.

References Cited in the file of this patent

UNITED STATES PATENTS

| | | |
|---|---|---|
| 1,298,548 | Mummert et al. | Mar. 25, 1919 |
| 1,691,518 | Hall | Nov. 13, 1928 |
| 2,006,902 | Morton | July 2, 1935 |
| 2,021,830 | Borgfeldt | Nov. 19, 1935 |
| 2,387,855 | Phillips | Oct. 30, 1945 |
| 2,560,775 | Olsen | July 17, 1951 |

FOREIGN PATENTS

| | | |
|---|---|---|
| 823 | Great Britain | Jan. 16, 1891 |
| 182,790 | Switzerland | May 16, 1936 |

OTHER REFERENCES

Automotive Industries of "Pedrick Sealed-Channel Compression Ring," page 460 (1 p.), October 5, 1935.